United States Patent
Nagatani (10) Patent No.: US 7,283,118 B2
(45) Date of Patent: Oct. 16, 2007

(54) BACK LIGHT UNIT AND LIQUID CRYSTAL DISPLAY APPARATUS

(75) Inventor: Shinpei Nagatani, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/100,423

(22) Filed: Mar. 18, 2002

(65) Prior Publication Data

US 2003/0098840 A1    May 29, 2003

(30) Foreign Application Priority Data

Nov. 27, 2001   (JP)   ............................. 2001-360962

(51) Int. Cl.
  *G09G 3/36*   (2006.01)
(52) U.S. Cl. ................. 345/102; 345/87; 345/103; 345/101; 345/104
(58) Field of Classification Search .......... 345/21, 345/5, 87, 101–106, 1, 76, 903, 82; 315/56, 315/57; 348/96; 40/361; 313/92; 349/58, 349/61, 62, 118, 150, 42; 359/50, 630; 382/12; 340/764; 362/632, 634
See application file for complete search history.

(56) References Cited

U.S. PATENT DOCUMENTS

| | | | | |
|---|---|---|---|---|
| 3,610,994 A | * | 10/1971 | Sheldon | 313/421 |
| 3,797,925 A | * | 3/1974 | Smitzer | 353/27 R |
| 5,184,116 A | * | 2/1993 | Daugherty et al. | 345/109 |
| 5,333,073 A | * | 7/1994 | Suzuki | 349/59 |
| 5,471,267 A | * | 11/1995 | Goto et al. | 396/317 |
| 5,537,296 A | * | 7/1996 | Kimura et al. | 362/31 |
| 5,574,477 A | * | 11/1996 | Shimizu et al. | 345/102 |
| 5,659,376 A | * | 8/1997 | Uehara et al. | 349/58 |
| 5,796,382 A | * | 8/1998 | Beeteson | 345/102 |
| 5,808,410 A | | 9/1998 | Pinker et al. | 313/493 |
| 5,815,224 A | * | 9/1998 | Hasegawa et al. | 349/58 |
| 5,838,412 A | * | 11/1998 | Ueda et al. | 349/150 |
| 5,867,240 A | * | 2/1999 | Crawford et al. | 349/118 |
| 5,875,269 A | * | 2/1999 | Yamashita et al. | 382/312 |
| 5,889,568 A | * | 3/1999 | Seraphim et al. | 349/73 |
| 5,946,062 A | * | 8/1999 | Hasegawa et al. | 349/58 |
| 6,007,209 A | | 12/1999 | Pelka | 362/30 |
| 6,020,867 A | * | 2/2000 | Shimada et al. | 345/87 |
| 6,061,489 A | | 5/2000 | Ezra et al. | 385/115 |
| 6,119,380 A | * | 9/2000 | Inbar | 40/361 |
| 6,292,239 B1 | * | 9/2001 | Nagamura et al. | 349/58 |

(Continued)

FOREIGN PATENT DOCUMENTS

GB       2307767    *   6/1997

(Continued)

*Primary Examiner*—Bipin Shalwala
*Assistant Examiner*—Prabodh Dharia
(74) *Attorney, Agent, or Firm*—Greer, Burns & Crain, Ltd.

(57) ABSTRACT

A back light unit includes a lamp, a lamp house where the lamp is housed, a diffusion plate provided parallel to a main surface of the lamp house, a display part receiving light irradiated from the lamp and displaying, a frame member that has a structure in which the diffusion plate and the display part can be housed inside of the frame member and that detachably connects to the lamp house, and a shield member connected in a range from the diffusion plate to the frame member so that a space between the diffusion plate and the frame member is shielded.

8 Claims, 6 Drawing Sheets

U.S. PATENT DOCUMENTS

| | | | | |
|---|---|---|---|---|
| 6,305,812 | B1 * | 10/2001 | Kim et al. | 362/632 |
| 6,310,667 | B1 * | 10/2001 | Nakayoshi et al. | 349/42 |
| 6,339,447 | B1 * | 1/2002 | Kurahashi et al. | 348/96 |
| 6,388,722 | B1 * | 5/2002 | Yoshii et al. | 349/62 |
| 6,449,023 | B2 * | 9/2002 | Swanson et al. | 349/62 |
| 6,504,518 | B1 * | 1/2003 | Kuwayama et al. | 345/7 |
| 6,550,953 | B1 * | 4/2003 | Ichikawa et al. | 315/56 |
| 6,600,175 | B1 * | 7/2003 | Baretz et al. | 257/100 |
| 6,646,809 | B1 * | 11/2003 | Ishino et al. | 359/630 |
| 6,655,810 | B2 * | 12/2003 | Hayashi et al. | 362/600 |
| 6,674,250 | B2 * | 1/2004 | Cho et al. | 315/291 |
| RE38,516 | E * | 5/2004 | Hasegawa et al. | 349/58 |
| 6,817,746 | B2 * | 11/2004 | Steiner et al. | 362/556 |
| 2001/0010569 | A1 * | 8/2001 | Jin et al. | 349/58 |
| 2001/0012087 | A1 * | 8/2001 | Sasuga et al. | 349/149 |
| 2002/0041144 | A1 * | 4/2002 | Fujishiro | 313/483 |
| 2002/0097205 | A1 * | 7/2002 | Nakamura | 345/82 |
| 2003/0095216 | A1 * | 5/2003 | Fujishiro et al. | 349/61 |

FOREIGN PATENT DOCUMENTS

| | | | |
|---|---|---|---|
| JP | 62-56343 | | 4/1987 |
| JP | 63-173274 | | 11/1988 |
| JP | 02252258 | * | 5/1992 |
| JP | 5-257128 | | 10/1993 |
| JP | 07-168177 | * | 4/1995 |
| JP | 7-168177 | | 7/1995 |
| JP | 10-105074 | | 4/1998 |
| KR | 2001-0048197 | | 7/2001 |
| KR | 2001-0064891 | | 7/2001 |

* cited by examiner

FIG. 8 ated appropriately. A diffusion plate (diffusion sheet)
BACK LIGHT UNIT AND LIQUID CRYSTAL DISPLAY APPARATUS

BACKGROUND OF THE INVENTION

1. Field of the Invention

The present invention generally relates to back light units and liquid crystal displays, and more particularly, to a back light unit and a liquid crystal display having a structure by which a foreign body is prevented from invading the space between the back light unit and a liquid crystal panel.

2. Description of the Related Art

There are several types of display apparatuses, such as a liquid crystal display or a cathode ray tube (CRT).

Since the liquid crystal display apparatus has several good points such as low consumption of electric power and a small thickness, marketing of the liquid crystal display apparatus has been expanding. Therefore, the liquid crystal display apparatus needs to have various properties more than the CRT.

The most important property required of the liquid crystal display apparatus is to have high luminance. Particularly, a liquid crystal display is required to have several times the luminance of the related art liquid crystal displays, without increasing manufacturing cost of the liquid crystal display apparatus.

As a means for realizing the high luminance of the liquid crystal display, up to now, using fluorescent tubes, namely lamps, as a light source, the electrical power provided to the individual fluorescent tubes has been increased, or the number of fluorescent tubes has been increased.

However, if high luminance of each of the fluorescent tubes is provided, other members in the liquid crystal display apparatus are thermally influenced by the heat generated by the fluorescent tubes. In addition, if the number of the fluorescent tubes is increased, other members in the liquid crystal display apparatus are thermally influenced and miniaturization of the liquid crystal display apparatus is obstructed. Thus, other means are necessary for realizing high luminance of the liquid crystal display apparatus.

Meanwhile, there are two types of back light units used for the liquid crystal display apparatus, an edge light type and a direct under type.

Figure 1:
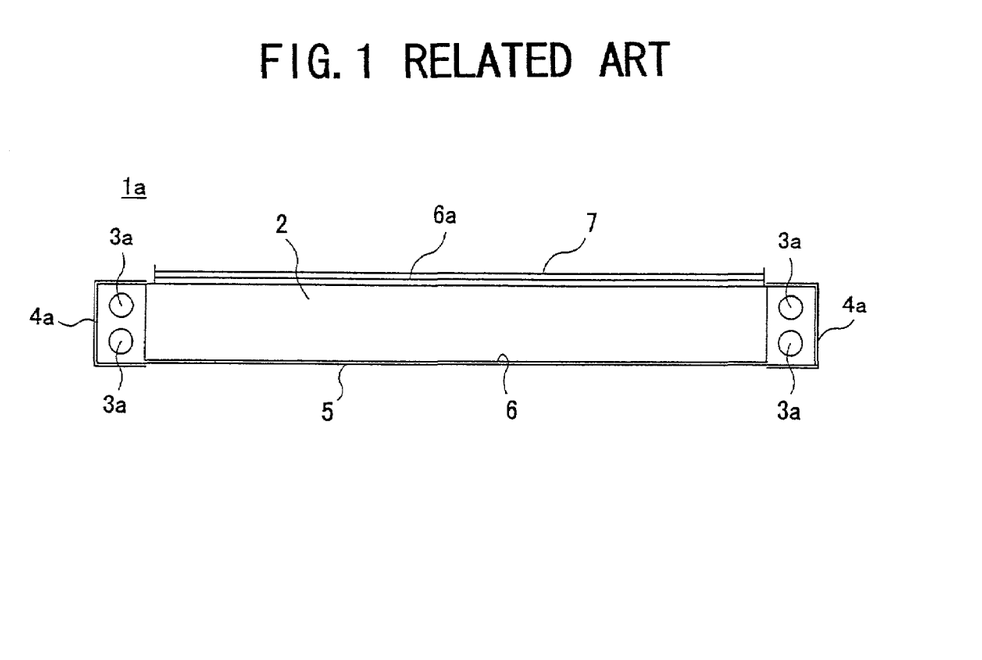
FIG. 1 is a schematic illustration of a structure of a related art edge light type back light unit.

FIG. 1 is a schematic illustration of a structure of a related art edge light type back light unit.

Referring to FIG. 1, the edge light type back light unit 1a includes plural cold cathode fluorescent tubes 3a. Each of the cold cathode fluorescent tubes 3a faces two side surfaces of the light guide plate 2. Reflectors 4a are provided as the reflectors 4a cover circumferences of the cold cathode fluorescent tubes 3a except an irradiation direction of the cold cathode fluorescent tubes 3a. A reflection sheet 5 is provided at a lower surface (back surface) side of the light guide plate 2. A diffuse reflection pattern 6 is formed on a lower surface of the light guide plate 2. The configuration, measurements, and density of the diffuse reflection pattern 6 are arranged appropriately. A diffusion plate (diffusion sheet) 6a is provided at an upper surface side of the light guide plate 2. A prism sheet 7 is further arranged on an upper surface of the diffusion plate 6a. A liquid crystal panel not shown in FIG. 1 is arranged at an upper position of the prism sheet 7 so that the liquid crystal display apparatus can be obtained.

In the edge light type back light unit 1a, a light radiated from the cold cathode fluorescent tubes 3a irradiates into the light guide plate 2. The light irradiated into the light guide plate 2 is changed to a light having a uniform luminance in a radiation surface of the light guide plate 2 by the diffuse reflection pattern 6. The light radiated from the light guide plate 2 permeates through the diffusion plate 6a and the prism sheet 7 so that a moving direction of the light is controlled. As a result, the liquid crystal panel arranged at the upper position of the prism sheet 7 is irradiated uniformly by the light radiated from the light guide plate 2. Thus, a display having a uniform luminance distribution can be obtained at the liquid crystal panel.

In this case, if consumption of electricity grows in a narrow space where the cold cathode fluorescent tubes 3a are arranged in order to produce the high luminance of the liquid crystal display, other members in the liquid crystal display apparatus are thermally influenced seriously. In addition, it is difficult to increase the number of the cold cathode fluorescent tubes 3a in the narrow space. In a structure in which the number of the cold cathode fluorescent tubes 3a can be increased, an advantage of the edge light type back light unit, namely a capability of making the liquid crystal display apparatus thin, is obstructed.

Figure 2:
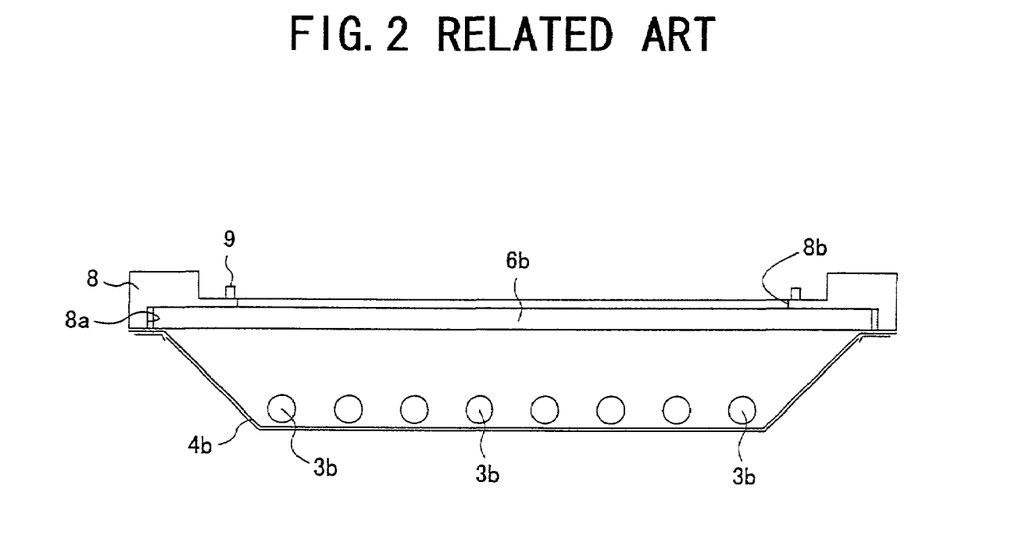
FIG. 2 is a schematic illustration of a structure of a related art direct under type back light unit.

FIG. 2 is a schematic illustration of a structure of the related art direct under type back light unit.

Referring to FIG. 2, in the direct under type back light unit 1b, the plural cold cathode fluorescent tubes 3b extending to front and back directions in a plane perpendicular to the paper of FIG. 2 are arranged parallel in right and left directions. A lamp house 4b is arranged on a periphery of the line of the plural cold cathode fluorescent tubes 3b as a reflector. A diffusion plate 6b is arranged at an upper position from the cold cathode fluorescent tubes 3b, namely an irradiation side of the cold cathode fluorescent tubes 3b, for example at an upper position of the lamp house 4b. A frame part 8 of the direct under type back light unit 1b has a frame body configuration. The frame part 8 includes a concave part 8a and an opening part 8b. The diffusion plate 6b is grasped between the concave part 8a of the frame 8 and a circumference edge part of the lamp house 4b. An edge part of the frame 8 and a most external circumference edge part of the lamp house 4b are fixed by a screw not shown in FIG. 2. A liquid crystal panel not shown in FIG. 2 is provided on an upper surface of the frame 8 with a spacer 9 having a frame body configuration. The circumference edge part of the liquid crystal panel and the frame part 8 are covered with a frame body not shown in FIG. 2 such as a metal bezel except for a display surface of an upper side of the liquid crystal panel.

In a case of the direct under type back light unit, it is relatively easy and creates little problem to increase the electrical power or increase the number of the cold cathode fluorescent tubes, as compared with the edge light type back light unit. Hence, it is easy for the direct under type back light unit to produce a high luminance of the liquid crystal display.

However, in a case of the direct under type back light unit, there are serious problems with regard to an exchange of the cold cathode fluorescent tube and a dispersion of the luminance of the plural cold cathode fluorescent tubes, as compared with the edge light type back light unit.

Figure 3:
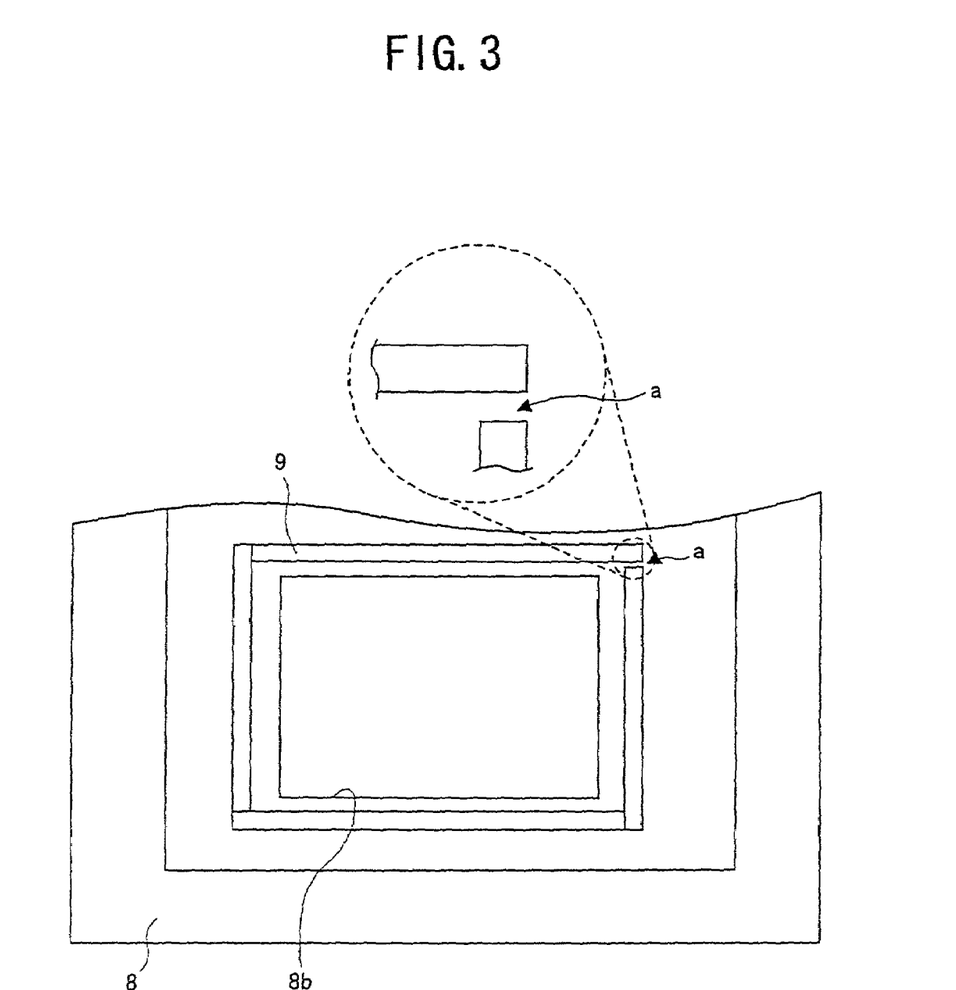
FIG. 3 is a plan view of a spacer of the direct under type back light unit shown in FIG. 2.

That is, in a case of the direct under type back light unit, when the cold cathode fluorescent tube is exchanged, it is necessary to remove the lamp house in which the plural cold cathode fluorescent tubes are arranged. Hence, it is complicated to exchange the cold cathode fluorescent tubes. Furthermore, in a state where the lamp house and the liquid crystal panel are separated, the diffusion plate is removed at a side where the lamp house is removed by removing the lamp house. Therefore, in this case, the liquid crystal panel faces outside air so that an outside foreign body may adhere to the liquid crystal panel. In addition, as shown in FIG. 3, the spacer 9 of the liquid crystal display apparatus assembled completely has a space shown by arrow a in FIG. 3 in order to have measurement tolerances and efficiency in assembling the liquid crystal display apparatus. In this case, even if a space at the back light unit side is made small so that the foreign particle is prevented from invading, the particle may invade from the liquid crystal panel side.

When a foreign body adheres to the liquid crystal panel, a problem such as a defect of displaying regarding the liquid crystal panel occurs. In order to prevent the defect, there is an idea to exchange the cold cathode fluorescent tubes in a clean room. However, it is more complicated to exchange the cold cathode fluorescent tubes in a clean room.

In a case of not only the direct under type back light unit but also the edge light type back light unit, the back light unit is separated based on the need for exchanging the lamps. The same problems in the direct under type back light may occur in the edge light type back light.

Furthermore, the direct under type back light has a structure in which the cold cathode fluorescent tubes are arranged in parallel. Each of the cold cathode fluorescent tubes irradiates only around the circumferences of the each of the cold cathode fluorescent tubes. Hence, it is difficult to maintain a uniform light level, as compared with the edge light type. Accordingly, if the luminance is reduced due to deterioration of one of the cold cathode fluorescent tubes, the reduced luminance causes a non-uniform luminance distribution of the back light unit and eventually of the liquid crystal panel. Therefore, when the consumption of the electricity increases in order to realize high luminance, non-uniform luminance of the liquid crystal panel occurs frequently since the service life of the cold cathode fluorescent tube is shortened.

SUMMARY OF THE INVENTION

Accordingly, it is a general object of the present invention to provide a novel and useful back light unit and a liquid crystal display in which one or more of the problems described above are eliminated.

In addition, there are two more specific objects of the present invention. It is a first object of the present invention to provide a back light unit and the liquid crystal display apparatus wherein it is possible to exchange the lamp easily without adhesion of foreign bodies to the display part such as a liquid crystal panel. It is a second object of the present invention to provide a back light unit and a liquid crystal display apparatus wherein the luminance distribution is not reduced in whole, even if one or more of the plural lamps are deteriorated and the degrees of their luminance are reduced.

The above objects of the present invention are achieved by a back light unit, including a lamp, a lamp house where the lamp is housed, a diffusion plate provided parallel to a main surface of the lamp house, a display part receiving light irradiated from the lamp and displaying, a frame member that has a structure in which the diffusion plate and the display part can be housed inside of the frame member and that detachably connects to the lamp house, and a shield member connected in a range from the diffusion plate to the frame member so that a space between the diffusion plate and the frame member is shielded.

According to the present invention as described above, foreign bodies are prevented from invading from the space between the diffusion plate and the frame member and adhering to the display part, when the lamp house is separated from the frame members and the lamps are exchanged. As a result, the defect of displaying regarding the liquid crystal panel is prevented from occurring when the lamps are exchanged. In addition, it is not necessary to exchange the lamps in a clean room and to handle the lamps carefully.

In this case, when the shield member is an elastic body such as a silicon gum sheet and a resin sheet, the sealability between the diffusion plate and the frame member improves by putting the shield member between the diffusion plate and the frame member tightly. The shield member and the diffusion plate and the frame member may be connected with the adhesive material.

The diffusion plate may slide on the shield member.

According to the present invention as described above, when a deformation of the diffusion plate occurs due to heat or other causes, the deformation of the diffusion plate is absorbed by sliding the diffusion plate against the shield member so that a strain stress does not occur.

Another object of the present invention is to provide a back light unit, including a lamp, a lamp case wherein a plurality of the lamps being in close formation are housed and that has a surface of an irradiation side made of a transparent material, a lamp house having a main surface wherein the lamp case is detachably connected to an outside surface part situated at a substantially center part of the main surface made of a transparent material, and a diffusion plate provided parallel to the main surface of the lamp house.

According to the present invention as described above, it is not necessary to remove the lamp house when the lamp is exchanged. Rather, only the lamp case is removed. Hence, a seal structure of the liquid crystal display apparatus may be maintained. As a result, it is possible to prevent foreign bodies from invading at the time of exchanging the lamps, as improvement over the conventional art. In addition, it is easy to exchange the lamps. Furthermore, plural lamps being in close formation form one light source so that there is no luminance distribution even if the luminance of one or more of the lamps is reduced.

It is another object of the present invention to provide a back light unit, including a lamp, a lamp case wherein a plurality of the lamps being in close formation are housed and that has a surface of an irradiation side made of a transparent material, a lamp house having a concave part made of a transparent material and a main surface wherein the concave part is situated at a substantially center part of the main surface and the lamp case is housed in the concave part, and a diffusion plate provided parallel to the main surface of the lamp house.

According to the present invention as described above, it is possible to shorten the height of the back light unit by the length of the lamp house housed in the concave part without an outside connection to a main surface of the lamp house.

It is another object of the present invention to provide a liquid crystal display apparatus, including a back light unit, and a liquid crystal display mounted on the back light unit, the back light unit including a lamp, a lamp house where the lamp is housed, a diffusion plate provided parallel to a main surface of the lamp house, a display part receiving light irradiated from the lamp and displaying, a frame member that has a structure in which the diffusion plate and the display part can be housed inside of the frame member and that detachably connects to the lamp house, and a shield member connected in a range from the diffusion plate to the frame member so that a space between the diffusion plate and the frame member is shielded.

According to the present invention as described above, it is possible to obtain a liquid crystal display apparatus in which the effect of the back light unit described above can be provided.

It is another object of the present invention to provide a liquid crystal display apparatus, including a liquid crystal panel, a back light unit provided on a back surface of the liquid crystal panel, and a spacer member provided at a space between the liquid crystal panel and the frame member of the back light unit and having a frame configuration comprised of four sides, wherein at least one side of the spacer member includes plural divisional parts and an end part of each of the divisional parts comes in contact with an end part of another divisional part.

As described above, in the related art, the spacer member having a frame body configuration and formed between the liquid crystal panel and the frame member of the back light unit has a partially inevitable space. However, according to the present invention as described above, since the space is shielded, foreign bodies are prevented from invading from the space and adhering to the liquid crystal panel.

Other objects, features, and advantages of the present invention will become more apparent from the following detailed description when read in conjunction with the accompanying drawings.

DETAILED DESCRIPTION OF THE PREFERED EMBODIMENTS

A description will now be given, with reference to the FIGS. 4 through 8, of embodiments of the present invention.

Figure 4:
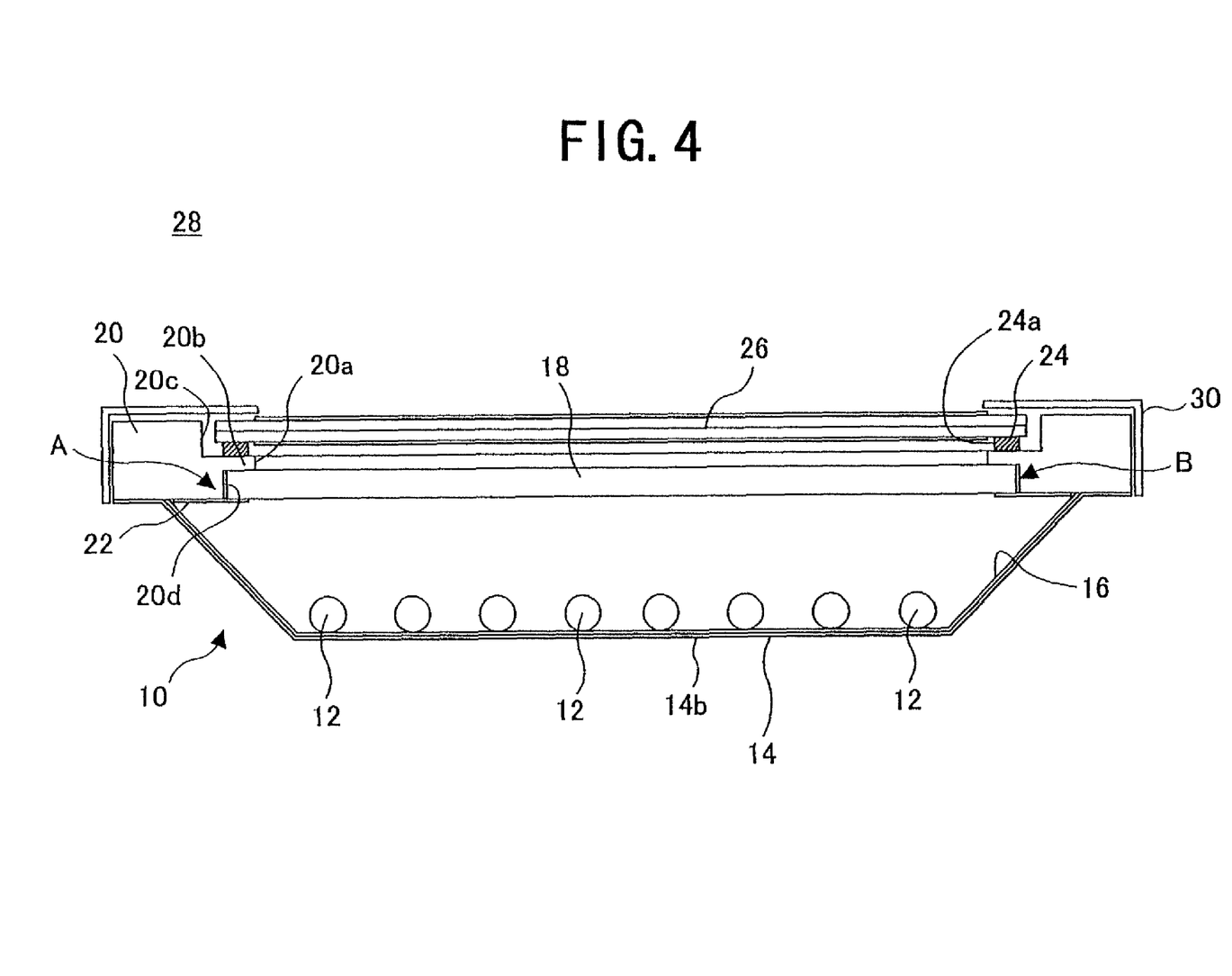
FIG. 4 is a schematic illustration of a structure of a back light unit of a first embodiment of the present invention.

FIG. 4 is a schematic illustration of a structure of a back light unit of a first embodiment of the present invention.

Referring to FIG. 4, a back light unit 10 of the first embodiment of the present invention is a direct under type back light unit.

In the back light unit 10, eight cold cathode fluorescent tubes (lamps) 12 extending to a front and back directions in a plane perpendicular to the paper of FIG. 4 are arranged parallel in right and left directions. The cold cathode fluorescent tubes 12 are housed in a lamp house 14 made of aluminum material, for example. A reflection sheet 16 such as E60L made by TORAY Industries Inc. is applied on an inside surface of the lamp house 14 as a reflector.

At an upper position of an irradiation side of the cold cathode fluorescent tube 12, the diffusion plate 18 is provided parallel to the main surface 14b of the lamp house 14. A frame member 20 having a frame body configuration is provided in order to support the liquid crystal panel 26. An opening part 20a is situated at the center of the frame member 20. The frame member is, for example, made of polycarbonate resin material. The frame member 20 has a circumference projection part 20b formed toward a side of the opening part 20a. Because of this, the convex parts 20c and 20d having notch configurations are formed on upper and lower parts of the circumference projection part 20b in FIG. 4. The circumference edge part of the diffusion plate 18 is inserted in the concave part 20d. A silicon gum sheet 22 such as a shield member or an elastic body is applied on a lower part in a range from the diffusion plate 18 to the frame member 20 as shown by an arrow A in FIG. 4, by an adhesion layer not shown in FIG. 4. As a result, a circumference edge part of the diffusion plate 18 is united with the frame member 20. Because of this, a space formed between the diffusion plate 18 and the frame member 20 shown by an arrow B in FIG. 4 is shielded by the silicon gum sheet 22. The frame member 20 is fixed at the circumference edge part of the lamp house 14 by a fixing member such as a screw (not shown).

A spacer member 24 having a frame body configuration is provided on a concave part 20c of the frame member 20. An opening part 24a is situated at a center of the spacer member 24. A liquid crystal panel (display part) 26 that receives light and displays is provided on the spacer member 24 so that the liquid crystal display apparatus can be obtained.

A frame body 30 such as a metal bezel covers the external circumference of the frame member 20 and fixes the circumference edge part of the liquid crystal panel 26 to the frame body 30. In this case, a space between the frame body 30 and the circumference edge part of the liquid crystal panel 26 is sealed by an elastic sheet, for example. As a result, foreign bodies such as dust are prevented from invading into the inside of the liquid crystal panel 26 primarily.

Figure 5:
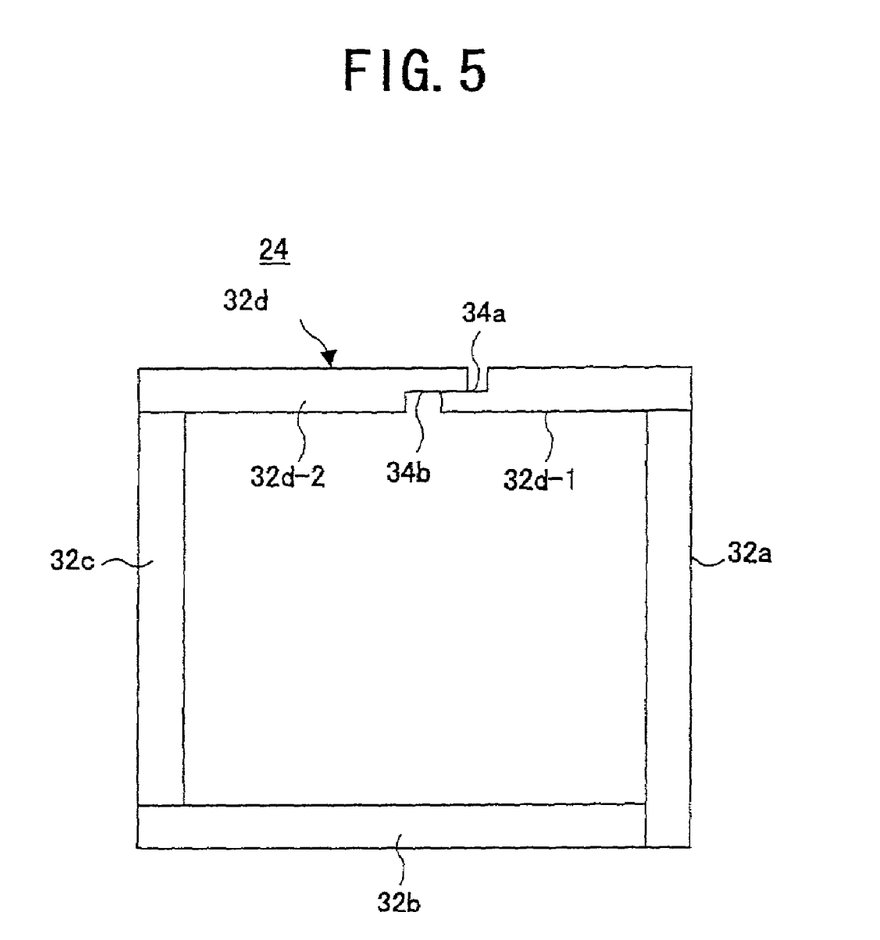
FIG. 5 is a plan view of a spacer member of the back light unit shown in FIG. 4.

Spacer member 24 will be described with reference to FIG. 5. FIG. 5 is a plan view of the spacer member 24 of the back light unit shown in FIG. 4.

Referring to FIG. 5, the spacer member 24 has a frame configuration formed by four sides having approximately the same measurements.

Three of frame segments (side construction members) 32a through 32c are prepared in order to construct three sides of the four-sided-spacer member 24. Each frame segment 32a through 32c has substantially the same length. Another frame segment 32d having two divisional parts 32d-1 and 32d-2 is prepared in order to construct the fourth side of the spacer member 24. The length where the divisional parts 32d-1 and 32d-2 are connected is longer than the lengths of other sides (frame segments 32a through 32c). Notch parts 34a and 34b having step configurations as connection parts are formed on side surfaces of respective end parts of the two of divisional parts 32d-1 and 32d-2. The notch parts 34a and 34b face each other. Adhesion is applied on one side surface of the end parts of the frame segments 32a through 32d to fix these members. The remaining side may be divided into more than three parts. In this case, the notch parts having a step configuration as a connection part may be formed on both end parts of at least one divisional part.

End parts of the three frame segments 32a through 32c come in contact so that the spacer member 24 has a rectangle configuration not having one side. And then, one end part of the divisional part 32d-1 comes in contact with an end part of the frame segment 32a. One end part of the divisional part 32d-2 comes in contact with an end part of the frame segment 32c. Furthermore, other end parts of two divisional parts 32d-1 and 32d-2 come in contact with each other. In this case, the notch parts 34a and 34b come in contact with each other so that the end parts of the two divisional parts 32d-1 and 32d-2 are sealed completely. As a result, the inside and the outside of the spacer member 24 are insulated from each other completely.

Because of this, it is possible in the present invention to prevent the partially inevitable space formed at the connecting parts of the four sides of the spacer member 24 in the related art from forming. It is possible to apply the above mentioned structure of the spacer member 24 to not only the direct under type back light unit but also the edge light type back light unit, and the edge light type back light unit also can obtain the same effect as the direct under type back light unit.

Since basic functions of the back light unit 10 and the liquid crystal display apparatus 28 of the present invention are the same as in the related art respectively, an explanation thereof will be omitted.

In the back light unit 10 and the liquid crystal display apparatus 28 according to the first embodiment, a space formed between the diffusion plate and the frame member is sealed by the silicon gum sheet. Accordingly, when the lamp house is separated from the frame member and the cold cathode fluorescent tube is exchanged, a foreign body is prevented from invading and adhering to the liquid crystal panel. Hence, a defect of displaying can be avoided. Therefore, it is not necessary to remove the lamp house in a clean room and to handle the lamps carefully in order to prevent a foreign body from invading. If a foreign body invades from the space formed between the diffusion plate and the frame member and the lamp house, the foreign body can be prevented from adhering to the liquid crystal panel since the spacer member has a complete seal structure.

Figure 6:
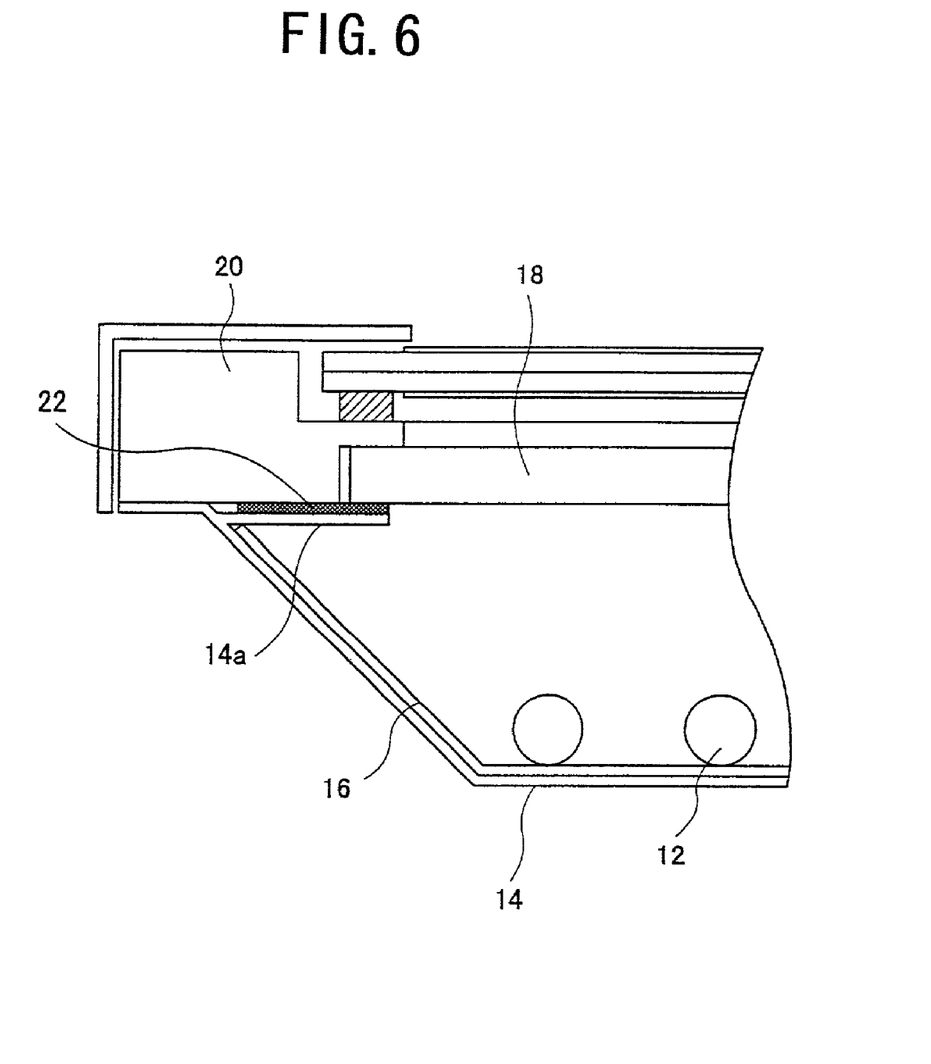
FIG. 6 is a partially enlarged view of another example of the back light unit according to the first embodiment of the present invention.

FIG. 6 is a partially enlarged view of another example of the back light unit according to the first embodiment of the present invention. Referring to FIG. 6, a circumference projection part 14a projecting to an inside of the lamp house 14 may be provided at a circumference edge part of the lamp house 14, so that the silicon gum sheet 22 may be put between the circumference projection part 14a and the diffusion plate 18 and the frame member 20. Because of this, it is possible to improve the sealability between the diffusion plate 18 and the frame member 20. In this case, a tape made of resin such as polyethylene terephthalate (PET), polypropylene (PP), or polyethylene (PE) may be used instead of the silicon gum sheet 22.

In this case, if the adhesion layer is not provided on a part of the silicon gum sheet 22 contacting the diffusion plate 18 and the diffusion plate 18 can slide against the silicon gum sheet 22, the deformation of the diffusion plate 18 due to heat or other causes is prevented by sliding the diffusion plate 18 against the silicon gum sheet 22. As a result of this, a strain stress may be prevented.

Figure 7:
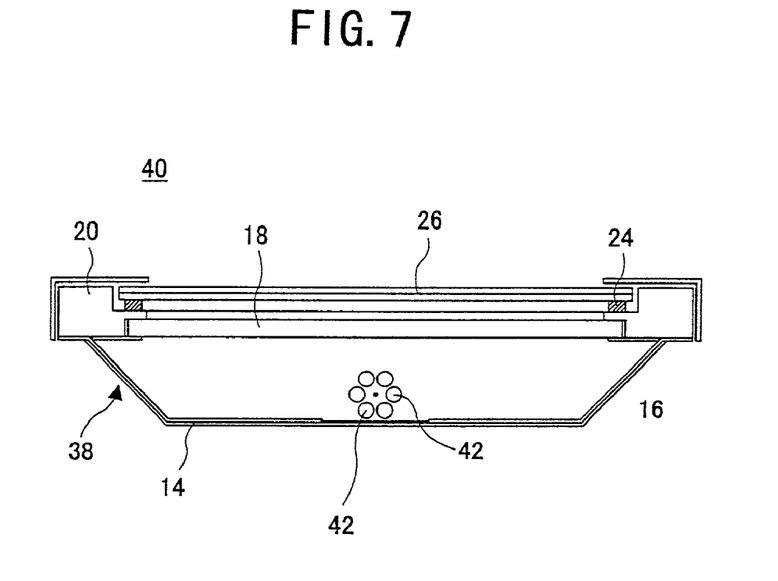
FIG. 7 is a schematic illustration of a structure of a back light unit of a second embodiment of the present invention.

Next, a description of a back light unit and a liquid crystal display apparatus of a second embodiment of the present invention will be given, with reference to the FIG. 7. FIG. 7 is a schematic illustration of a structure of a back light unit of a second embodiment of the present invention.

Since basic structures of a back light unit 38 and a liquid crystal display apparatus 40 are same as the back light unit 10 and the liquid crystal display apparatus 28 respectively, parts in FIG. 7 that are the same as the parts shown in FIG. 4 are given the same reference numerals, and explanation thereof will be omitted.

In the back light unit 38, plural cold cathode lamps 42 being in close formation are provided at a substantially center part of a main surface of the lamp house 14.

In the back light unit 38 and the liquid crystal display apparatus 40 according to the second embodiment of the present invention, the plural cold cathode fluorescent tubes being in close formation form one light source. Accordingly, even if the luminance of one part of the cold cathode fluorescent tube is reduced, a non-uniform light radiated from the back light unit and a luminance distribution of the liquid crystal panel are not caused. Accordingly, even if luminance of one part of the cold cathode fluorescent tube is reduced, it is not necessary to exchange the back light unit immediately. Hence, a number of exchanging the back light unit decreases so that the foreign bodies have less chance to invade the liquid crystal panel.

Figure 8:
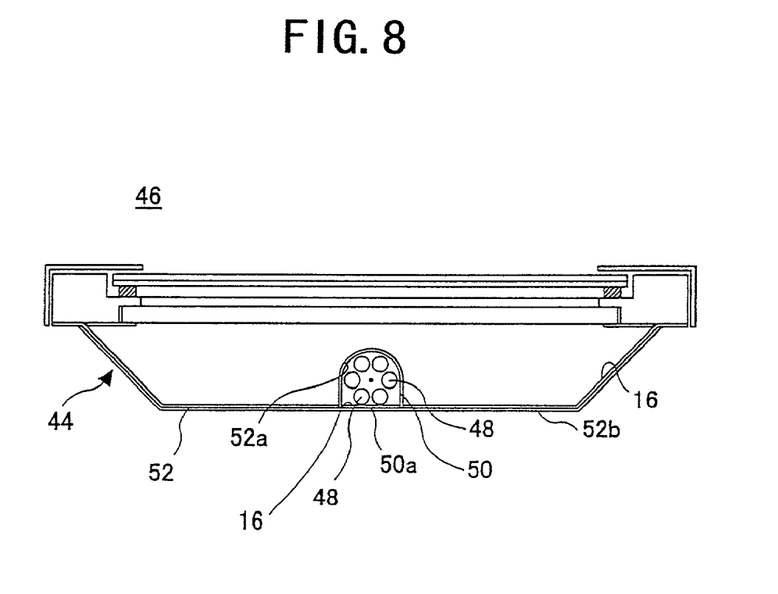
FIG. 8 is a schematic illustration of a structure of a back light unit of a third embodiment of the present invention.

Next, a description of a back light unit and a liquid crystal display apparatus of a third embodiment of the present invention will be given, with reference to the FIG. 8. FIG. 8 is a schematic illustration of a structure of a back light unit of the third embodiment of the present invention Since basic structures of a back light unit 44 and a liquid crystal display apparatus 46 are same as the back light unit 38 and the liquid crystal display apparatus 40, respectively parts in FIG. 8 that are the same as the parts shown in FIG. 7 are given the same reference numerals, and explanation thereof will be omitted.

In the back light unit 44, plural cold cathode fluorescent tubes 48 are housed in the lamp case 50. The lamp case 50 extends to front and back directions in a plane perpendicular to the paper of FIG. 8. The lamp case 50 has a configuration fitting a formation of the plural cold cathode fluorescent tubes 48 arranged as a circumferential configuration. That is, the lamp case 50 long-extending to front and back directions in a plane perpendicular to the paper of FIG. 8 has a cross sectional configuration of a half of an ellipse. The lamp case 50 is made of polycarbonate (PC) resin for example. The irradiation direction of the cold cathode fluorescent tubes is made transparent. The reflection sheet 16 as described above, for example, is applied on a back surface of the lamp house 50 as a reflector.

On the other hand, the concave part 52a, long-extending to front and back directions in a plane perpendicular to the paper of FIG. 8 and having a configuration fitting to the lamp case 50, is formed at a substantially center part of the main surface 52b of the lamp house 52. A reflection sheet 16 is not applied on an inside wall part of the concave part 52a so that the inside wall part of the concave part 52a is made transparent. Hence, the light from the cold cathode fluorescent tubes 48 permeates through the concave part 52a.

The lamp case 50 where the cold cathode fluorescent tubes 48 are housed is connected to the concave part 52a of the lamp house 52 detachably by proper fixing means. Because of this, the bottom surface 50a of the lamp case 50 and the main surface 52b of the lamp house 52 are the same surface.

The back light unit 44 and the liquid crystal display apparatus 46 according to the third embodiment of the present invention have the same effect as the effect obtained by the back light unit 38 and the liquid crystal display apparatus 40 of the second embodiment of the present invention. In addition, when the cold cathode fluorescent tube is exchanged, it is not necessary to remove the lamp house. It is necessary to remove just only the lamp case. Accordingly, it is possible to prevent a foreign body from invading when the cold cathode fluorescent tube is exchanged. In addition, it is possible to exchange the cold cathode fluorescent tube easily. Furthermore, the miniaturization of the liquid crystal apparatus is not obstructed by the lamp case.

The present invention is not limited to these embodiments, but variations and modifications may be made without departing from the scope of the present invention. For instance, in the back light unit 44 of the third embodiment of the present invention, it is not necessary to form the concave part in the main surface of the lamp house. Rather, a lamp case having a rectangular parallelepiped configuration may be connected from outside to the lower surface of the main surface of the lamp house for instance.

This patent application is based on Japanese priority patent application No. 2001-360962 filed on Nov. 27, 2001, the entire contents of which are hereby incorporated by reference.

What is claimed is:

1. A back light unit, comprising:
a lamp;
a lamp house where the lamp is housed;
a diffusion plate provided parallel to a main surface of the lamp house;
a display part receiving light irradiated from the lamp and displaying;
a frame member that has a structure in which the diffusion plate and the display part can be housed inside of the frame member and that detachably connects to the lamp house; and
a shield member shielding a space between the diffusion plate and the frame member, the frame member connecting to the shield member, and the diffusion plate capable of engagement with the shield member.

2. The back light unit as claimed in claim 1, wherein the shield member is an elastic member.

3. The back light unit as claimed in claim 1, wherein the diffusion plate can slide on the shield member.

4. A back light unit, comprising:
a lamp case housing a plurality of lamps in close formation, and having a surface of an irradiation side made of a transparent material;
a lamp house having a main surface made of a transparent material, and to which the lamp case is detachably connected to an outside surface part situated at a substantially center part of the main surface; and
a diffusion plate provided parallel to the main surface of the lamp house.

5. A back light unit, comprising:
a lamp case housing a plurality of lamps in close formation, and having a surface of an irradiation side made of a transparent material;
a lamp house having a concave part made of a transparent material and a main surface wherein the concave part is situated at a substantially center part thereof, the lamp case being housed in the concave part; and
a diffusion plate provided parallel to the main surface of the lamp house.

6. A liquid crystal display apparatus, comprising:
a back light unit; and
a liquid crystal display mounted on the back light unit, the back light unit comprising:
a lamp;
a lamp house where the lamp is housed;
a diffusion plate provided parallel to a main surface of the lamp house;
a display part receiving light irradiated from the lamp and displaying;
a frame member that has a structure in which the diffusion plate and the display part can be housed inside of the frame member and that detachably connects to the lamp house; and
a shield member shielding a space between the diffusion plate and the frame member, the frame member connecting to the shield member, and the diffusion plate capable of slidable engagement with the shield member.

7. A liquid crystal display apparatus, comprising:
a liquid crystal panel;
a back light unit provided on a back surface of the liquid crystal panel; and
a spacer member provided at a space between the liquid crystal panel and a frame member of the back light unit and having a frame configuration comprised of four sides;
wherein at least one side of the spacer member includes plural divisional parts and an end part of each of the divisional parts comes in contact with an end part of another divisional part at a location separate from where respective ones of the four sides join.

8. The liquid crystal display apparatus as claimed in claim 7, wherein the one side of the spacer member having the divisional parts has a longer length than the other sides, notch parts having a step configuration are formed on a side surface of the end part of the divisional parts, and one of the notch parts faces another notch part, so that the divisional parts are connected to each other by the notch parts.

* * * * *